Feb. 14, 1939.  W. A. HEITNER  2,147,034
RETAINING MEANS
Filed Nov. 27, 1936  4 Sheets-Sheet 1

Inventor
William A. Heitner
By Henry Fuchs
Atty.

Feb. 14, 1939. W. A. HEITNER 2,147,034
RETAINING MEANS
Filed Nov. 27, 1936 4 Sheets-Sheet 2
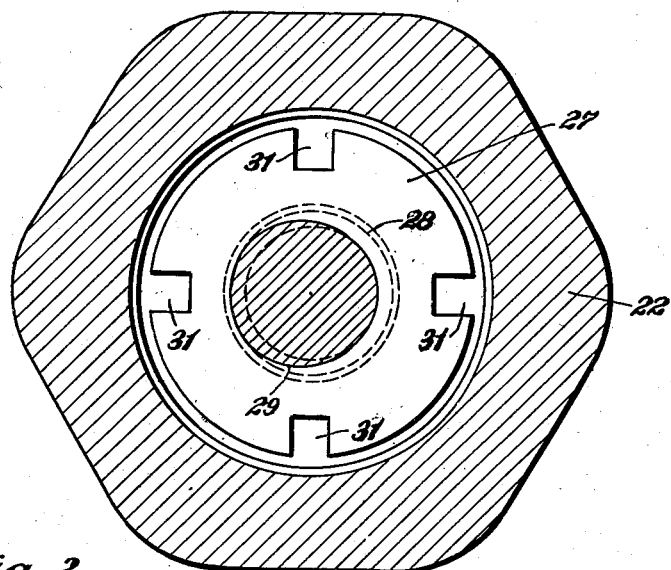
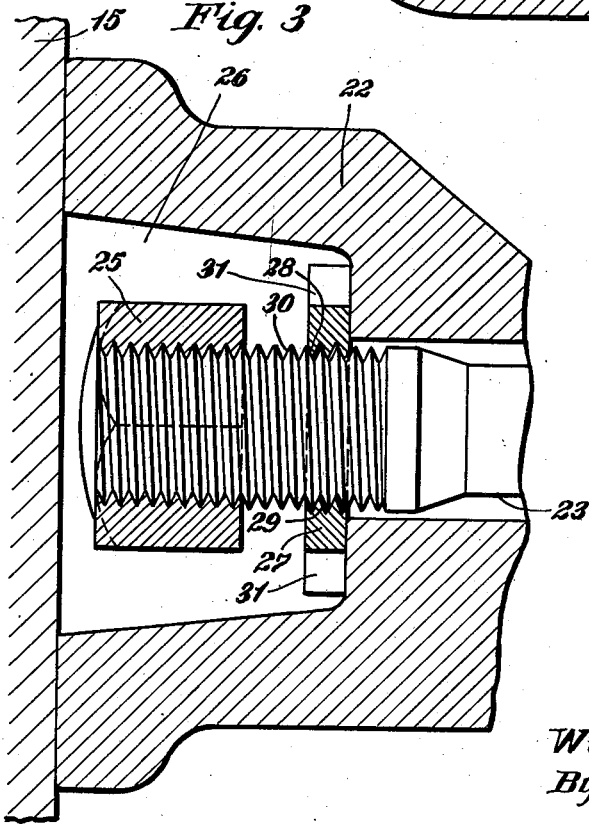
Inventor
William A. Heitner
By Henry Fuchs
Atty.

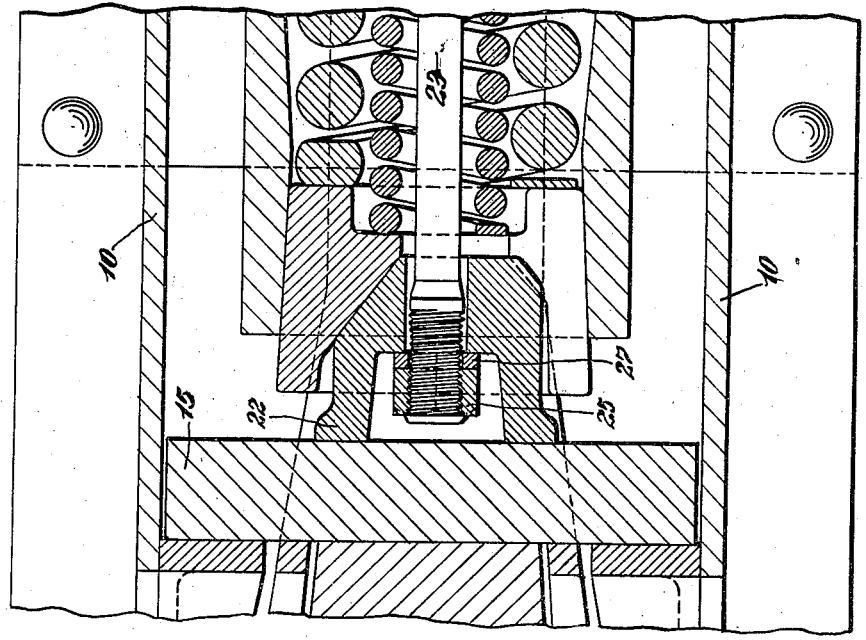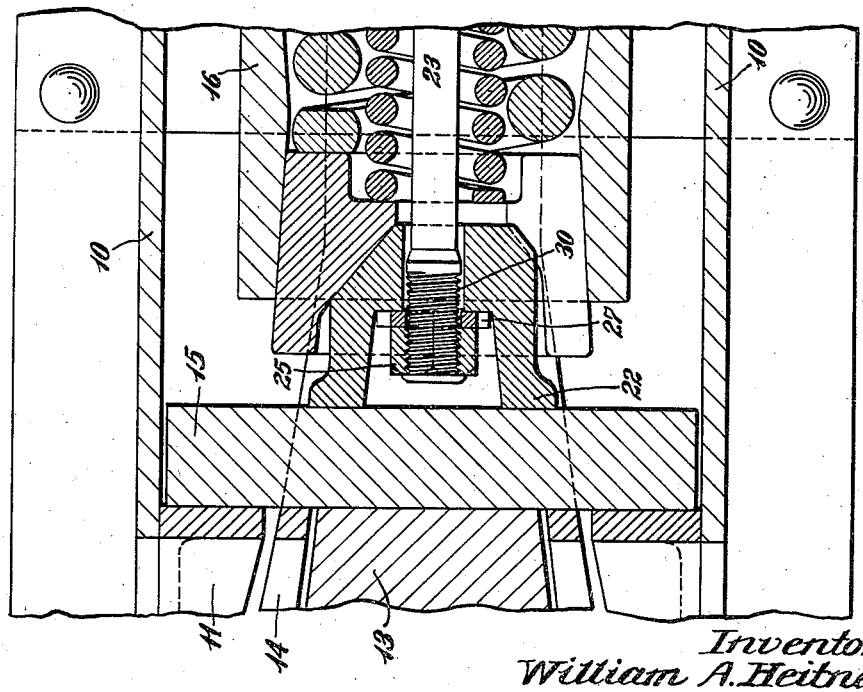

Feb. 14, 1939.  W. A. HEITNER  2,147,034
RETAINING MEANS
Filed Nov. 27, 1936  4 Sheets-Sheet 4

Inventor
William A. Heitner
By Henry Fuchs
Atty.

Patented Feb. 14, 1939

2,147,034

UNITED STATES PATENT OFFICE 2,147,034

RETAINING MEANS

William A. Heitner, Chicago, Ill., assignor to W. H. Miner, Inc., Chicago, Ill., a corporation of Delaware Application November 27, 1936, Serial No. 112,937

6 Claims. (Cl. 213—32)

This invention relates to improvements in retaining means, especially adapted for use with friction shock absorbing mechanisms of railway draft riggings, and more particularly to retaining means for temporarily holding the mechanism partly compressed to shorten the overall length thereof prior to and during application of the same to the car, to facilitate inserting the mechanism into the pocket of the rigging.

One object of the invention is to provide in a shock absorbing mechanism for railway draft riggings, simple and efficient retaining means having shouldered engagement with the usual retaining bolt of the shock absorbing mechanism for temporarily holding the latter under a predetermined amount of initial compression, thereby reducing the overall length thereof to facilitate placing the same between the stop members of the draft sills of the car, the shouldered engagement being rendered inoperative through operation of the shock absorbing mechanism in service, thus permitting expansion of the shock absorbing mechanism to its normal maximum overall length to meet service conditions.

A further and more specific object of the invention is to provide means of the character described in the preceding paragraph in the form of a holding nut threaded on the retainer bolt of the shock absorbing mechanism, so arranged and designed that the threads thereof are readily stripped through actuation of the shock absorbing mechanism in service to permit the mechanism to immediately assume its proper overall length.

Other objects of the invention will more clearly appear from the description and claims hereinafter following.

Figure 1:
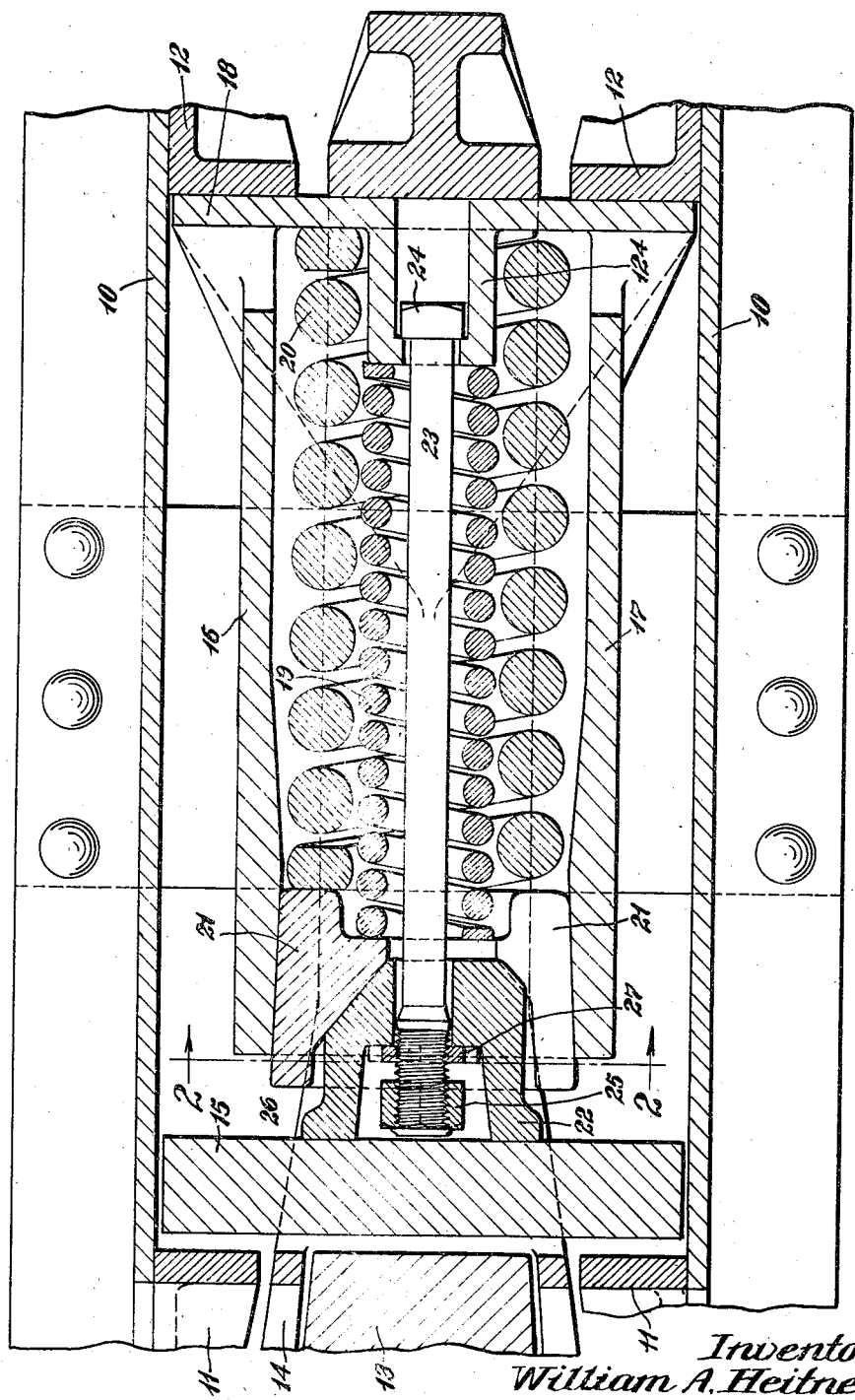
Figure 5:
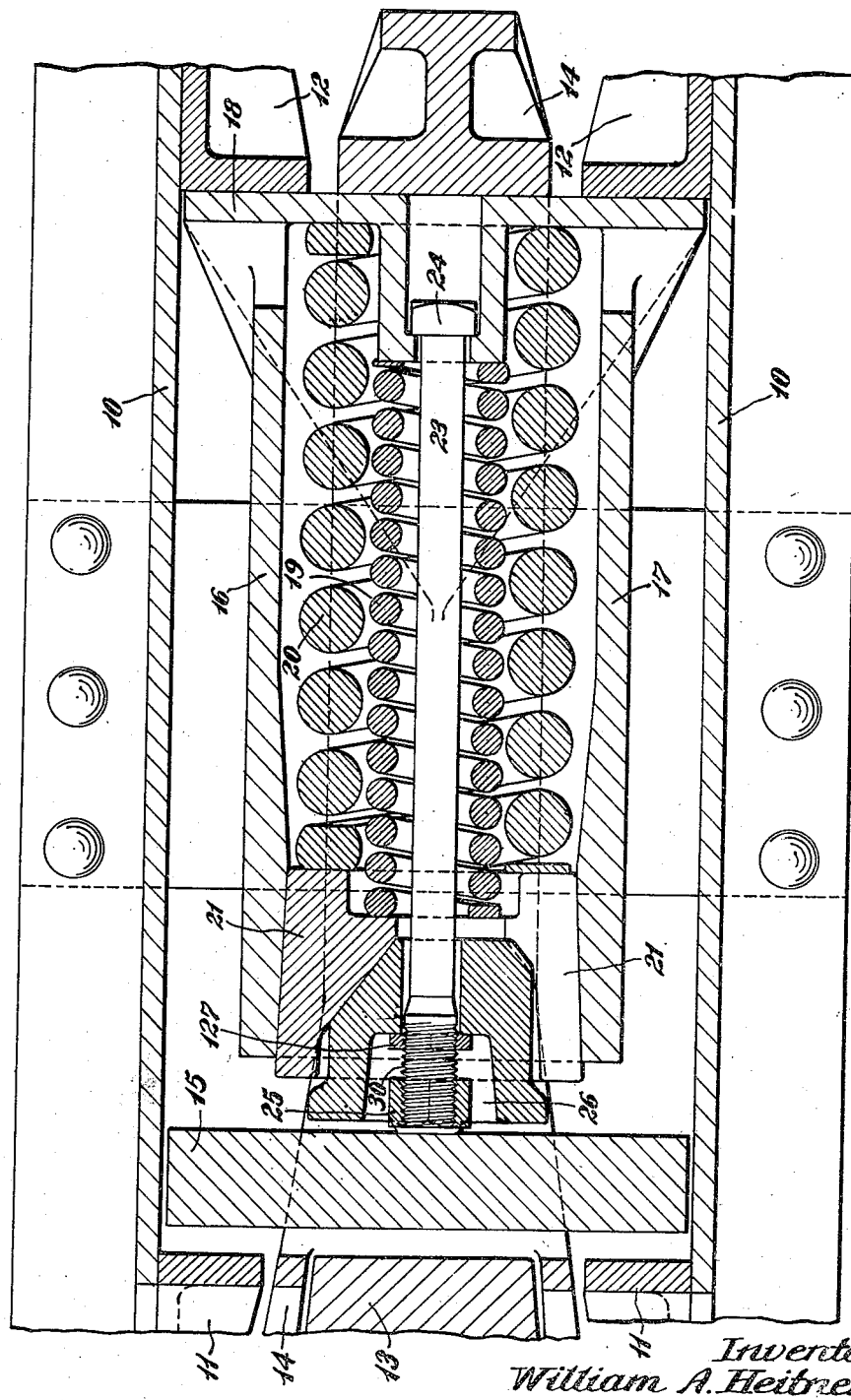

In the drawings forming a part of this specification, Figure 1 is a horizontal, longitudinal, sectional view through the underframe structure and shock absorbing mechanism of a railway car, illustrating my improvements in connection therewith, the shock absorbing mechanism being illustrated as slightly contracted or shortened. Figure 2 is a transverse, vertical, sectional view on an enlarged scale, corresponding substantially to the line 2—2 of Figure 1, the friction shell and shoes being omitted. Figure 3 is a broken view, on an enlarged scale, similar to Figure 1, but showing the forward end portion only of the structure disclosed in said figure, the friction shell and shoes being omitted. Figure 4 is a broken view, similar to Figure 1, showing the forward end portion only of the structure illustrated in Figure 1 and disclosing the shock absorbing mechanism in full release position expanded to its normal overall length and illustrating my improved retaining means in the position assumed after the shouldered engagement thereof with the retaining bolt has been destroyed. Figure 5 is a view similar to Figure 1 illustrating another embodiment of the invention. Figure 6 is a broken view similar to Figure 5, showing the forward end portion only of the structure illustrated in Figure 5 and illustrating the shock absorbing mechanism in full release position expanded to normal overall length and my improved retaining means in the position assumed after shouldered engagement thereof with the retainer bolt has been destroyed.

In said drawings, the draft sills of a railway car are designated by 10—10. The sills 10—10 have the usual front and rear stop lugs 11—11 and 12—12 fixed to the inner faces thereof. The inner end of the coupler shank of the draft rigging is designated by 13 and a hooded yoke 14 of well-known form is connected thereto in the usual manner. A front main follower 15 and a shock absorbing mechanism 16, in which my improvements are embodied, are disposed within the yoke.

Although my improved retaining means is capable of employment with any well-known type of shock absorbing mechanism comprising relatively movable members having spring means resisting approach thereof to cushion the shocks, in the present instance my improved retaining means is illustrated as employed in connection with one well-known type of friction shock absorbing mechanism. The friction shock absorbing mechanism illustrated in the drawings includes a friction shell 17 having a rear enlarged portion 18 cooperating with the rear stop lugs 12—12. The shell 17 contains the usual spring resistance means comprising inner and outer coils 19 and 20. A plurality of friction shoes 21—21—21 have frictional engagement with the inner surfaces of the walls of the shell 17 and a wedge block 22 has wedging engagement with the shoes in the usual manner. The wedge block 22 cooperates with the front main follower 15. The parts of the mechanism are held assembled by a retainer bolt 23 headed at the rear end, as indicated at 24, and having a nut 25 threaded on the front end thereof, the headed end having shouldered engagement with an inwardly projecting hollow boss 124 on the rear wall of the shell 17. The nut 25 of the retainer bolt 23 is accommodated in a pocket 26 opening through the front end of the wedge block 22.

Referring to the embodiment of the invention illustrated in Figures 1 to 4 inclusive, the improved retaining means for temporarily holding the mechanism shortened so as to permit application of the same within the gear pocket between the draft sills of the car, consists of a nut 27 in the form of a relatively thin disc having a central opening 28 provided with threads 29 adapted to engage with the threads 30 of the bolt 23. As shown in Figures 3 and 4, the disc-shaped nut 27 is of such a diameter that it projects laterally outwardly beyond the sides of the retaining nut 25. The nut 27 is provided with four notches 31—31 in the periphery thereof to facilitate application of the nut, the notches being formed to receive the engaging portion of a spanner wrench or similar tool for rotating the nut.

As will be evident, the nut 27 when in position on the bolt 23, as shown in Figure 1, holds the shock absorbing mechanism partly compressed, the overall length under this condition being such that ample clearance is provided between the shock absorbing mechanism and the front and rear ends of the draft gear pocket of the underframe structure of the car to permit an easy insertion of the same into the pocket. The nut 27 is so designed that the strength of the shouldered connection provided by the cooperating threads of the same and the bolt 23 is ample to hold tightly and not break down by stripping of the threads so long as the force exerted thereon does not materially exceed the potential energy of the compressed springs, but is insufficient to resist stripping of said threads when subjected to the usual recoil force of the springs in release of the mechanism after having been compressed in absorbing a shock under actual service conditions. To provide a shouldered connection which has the characteristics indicated, the threaded connection between the nut 27 and the bolt 23 is somewhat loose to provide a certain amount of play and the number of engaging thread members on the nut are limited by forming the nut of relatively thin material. The nut 27 is preferably made of the same metal as the bolt and having the same degree of hardness, but the invention is not limited to a nut of this character and one of softer material than the bolt and made of the proper thickness to have the characteristics indicated may be employed with equally good results. It is further pointed out that although the best and most reliable results are obtained by providing the loose threaded connection between the nut 27 and the bolt 23, it is obviously within the invention to employ a nut having the standard thread fit with the threads of the bolt wherein the strength of the threaded connection is such that the nut will hold the mechanism temporarily partly compressed but will not stand up under the recoil action of the springs.

When the friction shock absorbing mechanism is first assembled, the retainer bolt is applied by inserting the same through the rear end of the friction shell 17, with the spring, friction shoes, and wedge in place within the shell. The nuts 27 and 25 are then successively threaded on the bolt 23, the nut 27 being screwed inwardly on the bolt to the position shown in Figures 1 and 3 to hold the mechanism partly compressed and shortened to the proper overall length to permit easy application thereof to the draft gear pocket of the car. The nut 25 is adjusted so that, with the thickness of the nut 27 interposed between the shoulder of the wedge 22 and the nut 25, the shock absorbing mechanism will be held against expansion to an extent beyond the maximum overall length required in service and so as to properly cooperate with the front and rear stop lugs 11—11 and 12—12 of the draft sills. In other words, the nut 25 is so adjusted that the rear end of the friction shell will bear on the rear stop lugs 12—12 and the front follower 15, which is engaged by the wedge 22, will bear on the front stop lugs 11—11 when the mechanism is fully expanded with the threads of the nut 27 stripped so that the nut is loose on the bolt 23 and acts as a filler member between the nut 25 and the stop shoulder of the wedge block 22. In this connection it is pointed out that the nut 27 may be manipulated for adjusting the mechanism to its shortened overall length after the nut 25 has been applied and adjusted to position to determine the maximum overall length of the shock absorbing mechanism in service, the nut 27 being readily accessible through the open front end of the pocket 26 of the wedge 22, their being sufficient clearance between the nut 25 and the side walls of the pocket to accommodate and permit manipulation of a spanner wrench or similar tool for turning the nut 27. As will be evident, the shock absorbing mechanism 16 when when first inserted within the draft gear pocket is of the shortened overall length shown in Figure 1 and remains of that length, held by the nut 27, until the shock absorbing mechanism is operated in service to obsorb shocks in the usual manner. As is well understood by those skilled in this art, the shock absorbing mechanism in service on a railway car is compressed to a greater or less extent to absorb shocks of different degrees of intensity, each compression of the mechanism being followed by releasing action thereof, wherein the spring expands due to reduction of the actuating force to move the parts towards the normal full release position of the mechanism. This recoil of the spring in service projects the wedge outwardly with sufficient force to strip the threads of the nut 27 and permit expansion of the mechanism to its normal full overall length as limited by the heavy fixed nut 25 on the bolt 23. This stripping of the threads of the nut 27 is accomplished by the first substantial recoiling action of the spring of the mechanism and thereafter the mechanism is free to expand to its permissible maximum overall length, as clearly shown in Figure 4.

Referring next to the embodiment of the invention illustrated in Figures 5 and 6, the construction is substantially the same as that described in connection with Figures 1 to 4 inclusive, with the exception that the nut, which is indicated by 127, for temporarily holding the mechanism under compression is so arranged and designed that stripping of the threads thereof is effected through compression of the mechanism instead of through the recoil thereof. As shown in Figure 5, the nut 127 is in the form of a relatively thin disc threaded on the bolt 23 and in shouldered engagement with the inner end wall of the pocket 26 of the wedge 22, thereby holding the mechanism partly compressed. The nut 127 is so positioned with respect to the front end of the bolt 23 that the end of the bolt and the nut 25 protrude a short distance beyond the outer limits of the wedge block 22. As will be evident, the full impact of the shock imparted to the shock absorbing mechanism is thus initially transmitted to the bolt 23 and the nut 127, thereby effecting stripping of the threads of the nut 127 which is in shouldered engagement with the wedge 22, and permitting movement of the bolt lengthwise in the nut 127 so that the bolt will be projected inwardly with respect to the wedge 22 until the wedge is engaged and actuated by the front follower 15. Inasmuch as the threads of the nut have been thus stripped, the latter thereafter acts merely as a filler member between the nut 25 and the shoulder at the inner end of the pocket of the wedge 22 in a manner similar to the nut 27 hereinbefore described so that the nut 25 functions to limit the expansion of the mechanism to the permissible maximum uniform overall length required in service.

I have herein shown and described what I now consider the preferred manner of carrying out my invention, but the same is merely illustrative and I contemplate all changes and modifications that come within the scope of the claims appended hereto.

I claim:

1. In a shock absorbing mechanism for railway draft riggings, the combination with yieldingly resisted, relatively movable members adapted to cushion shocks upon relative approach thereof; of retaining means for holding said shock absorbing mechanism partly contracted when initially assembled, said retaining means including a pair of members in shouldered engagement with each other and in shouldered engagement respectively with said movable members to limit relative separation of the latter, the shouldered connection between said pair of members being of a strength to hold tightly and resist stripping of the shoulders thereof under the action of a force corresponding to the potential energy of said partly compressed mechanism, but of insufficient strength to resist stripping thereof when subjected to a greater force; and stop means on one of said last named members engageable by the other of said last named members after said shouldered connection is stripped for positively limiting relative separation of said shock cushioning members.

2. In a shock absorbing mechanism for railway draft riggings, the combination with spring resisted, relatively movable members adapted to cushion shocks upon relative approach thereof; of a retainer bolt anchored to one of said members; a holding member surrounding and having shouldered engagement with said bolt and the other of said movable members for holding said shock absorbing mechanism partly contracted when initially assembled, said shouldered connection between the holding member and bolt being of a strength to resist stripping of the shoulders thereof when subjected to the potential energy of said partly compressed mechanism but of insufficient strength to resist stripping by a force greater than said potential energy; and a retainer nut fixed to said bolt and spaced outwardly and in overhanging relation with respect to said holding member, said nut being engageable by said holding member to limit outward movement of the latter on said bolt when the shouldered connection of said holding member with the bolt has been stripped, thereby limiting relative separation of said members and maintaining said mechanism of maximum uniform overall length.

3. In a shock absorbing mechanism for railway draft riggings, the combination with relatively movable members adapted to absorb shocks upon relative approach thereof; of spring means opposing relative approach of said members; and means for limiting relative separation of said members in service and maintaining said mechanism of maximum uniform overall length including a retainer bolt anchored at one end to one of said members, a retaining nut on the other end of said bolt, and a second nut on said bolt inwardly of said first nut, said second nut being in threaded engagement with said bolt when the mechanism is initially assembled and in shouldered engagement with the other of said movable members for temporarily holding the mechanism partly compressed to an overall length less than said maximum overall length, said second named nut being relatively thin to permit stripping of the threads thereof and movement of the second named nut on said bolt lengthwise of the latter when the nut is subjected to a force in excess of the force exerted thereon due to the potential energy of the spring means of said partly compressed mechanism, said second named nut serving as a filler member between the first named retaining nut of the bolt and the movable member at the corresponding end of the mechanism.

4. In a shock absorbing mechanism for railway draft riggings, the combinaiton with relatively movable members, and spring means interposed between said members and yieldingly resisting relative approach thereof; of a retainer bolt anchored at one end to one of said members; and inner and outer spaced nuts threaded on the other end of said bolt, the inner nut having shouldered engagement with the other of said members when the mechanism is initially assembled, the threaded connection between said inner nut and the bolt being weakened to strip when subjected to the recoil action of the mechanism, thereby disengaging said inner nut from the bolt and permitting expansion of the mechanism to its maximum overall length held by said outer nut.

5. In a shock absorbing mechanism for railway draft riggings, the combination with relatively movable members and spring means interposed between said members and yieldingly resisting relative approach thereof; of a retainer bolt anchored at one end to one of said members; a relatively heavy retaining nut secured to the other end of said bolt for limiting relative separation of said movable members in service and maintaining said mechanism of maximum uniform overall length; and a temporary retaining nut on said bolt in shouldered engagement with the other of said members for holding said mechanism partly compressed when initially assembled, said temporary nut having loose threaded engagement with said bolt and being spaced inwardly from said first named nut, said temporary nut being relatively thin to permit stripping of the threaded connection thereof with the bolt through the recoil action of said mechanism in service, said temporary nut being slidable lengthwise of the bolt after the threads have been stripped and acting as a filler between said first named nut and the shoulder of the movable member at the corresponding end of the mechanism.

6. In a shock absorbing mechanism for railway draft riggings, the combination with relatively movable members adapted to absorb shocks upon relative approach thereof; of spring means opposing relative approach of said members; and means for limiting relative separation of said members in service and maintaining said mechanism of maximum uniform overall length including a retainer bolt anchored at one end to one of said members, a retaining nut on the other end of said bolt, and a second retaining nut on the bolt inwardly of said first nut, said second nut being in threaded engagement with said bolt when the mechanism is initially assembled and in shouldered engagement with the other of said movable members for temporarily holding said mechanism partly compressed to an overall length less than said maximum overall length and for temporarily holding said bolt projected outwardly beyond the corresponding movable member of the mechanism, whereby said bolt is adapted to receive the initial actuating force upon compression of said mechanism in service and effect stripping of the thread of said second named nut to render the same inoperative.

WILLIAM A. HEITNER.